US010827088B2

(12) United States Patent
Tomi et al.

(10) Patent No.: US 10,827,088 B2
(45) Date of Patent: Nov. 3, 2020

(54) IMAGE FORMING APPARATUS WHICH REGISTERS IMAGE TO BE USED FOR CONTROLLING JOB AND METHOD FOR CONTROLLING IMAGE FORMING APPARATUS

(71) Applicant: CANON KABUSHIKI KAISHA, Tokyo (JP)

(72) Inventors: Hideyasu Tomi, Yokohama (JP); Shigeki Hasui, Tokyo (JP); Masanori Ichikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/790,831

(22) Filed: Oct. 23, 2017

(65) Prior Publication Data
US 2018/0115672 A1 Apr. 26, 2018

(30) Foreign Application Priority Data

Oct. 26, 2016 (JP) ................... 2016-209492

(51) Int. Cl.
G06K 15/00 (2006.01)
H04N 1/00 (2006.01)
G06K 9/00 (2006.01)
G06K 9/62 (2006.01)

(52) U.S. Cl.
CPC ..... H04N 1/00848 (2013.01); G06K 9/00483 (2013.01); G06K 9/6202 (2013.01); G06K 9/6255 (2013.01); H04N 1/00846 (2013.01); H04N 1/00875 (2013.01)

(58) Field of Classification Search
CPC combination set(s) only.
See application file for complete search history.

(56) References Cited

U.S. PATENT DOCUMENTS

| 8,238,638 | B2 | 8/2012 | Mueller | |
|---|---|---|---|---|
| 2008/0031549 | A1 | 2/2008 | Konishi | |
| 2009/0016615 | A1* | 1/2009 | Hull | G06K 9/00449 382/217 |
| 2009/0196485 | A1* | 8/2009 | Mueller | G06K 9/036 382/137 |

(Continued)

FOREIGN PATENT DOCUMENTS

CN 101163188 A 4/2008
CN 101505349 A 8/2009

(Continued)

Primary Examiner — Henok Shiferaw
(74) Attorney, Agent, or Firm — Canon U.S.A., Inc. IP Division

(57) ABSTRACT

An image forming apparatus that determines whether an image having coincidence with a registered image is included in an input image and controls execution of a job that uses the input image based on a result of the determination. The image forming apparatus includes an input unit that inputs a first image as a candidate of the registered image, an evaluation unit that evaluates whether the first image is suitable for use in the determination, and a control unit registers the first image as the registered image if the evaluation unit evaluates that the first image is suitable for use in the determination, and prevents the first image from being registered as the registered image if the evaluation unit evaluates that the first image is unsuitable for use in the determination.

8 Claims, 12 Drawing Sheets

(56) References Cited

U.S. PATENT DOCUMENTS

| | | | |
|---|---|---|---|
| 2009/0202156 A1 | 8/2009 | Konishi | |
| 2012/0051649 A1* | 3/2012 | Saund | G06K 9/6255 |
| | | | 382/195 |
| 2013/0125234 A1* | 5/2013 | Nishiyama | H04N 1/4413 |
| | | | 726/21 |
| 2014/0040187 A1* | 2/2014 | Hatori | G06K 9/00926 |
| | | | 707/609 |
| 2015/0269422 A1* | 9/2015 | Wada | G06K 9/00295 |
| | | | 382/118 |

FOREIGN PATENT DOCUMENTS

| | | | |
|---|---|---|---|
| CN | 103313018 A | | 9/2013 |
| JP | H10-210303 A | | 8/1998 |
| JP | 2008-065572 A | | 3/2008 |
| JP | 2008-283658 A | | 11/2008 |
| JP | 2009-087262 A | | 4/2009 |
| JP | 2010212859 A | * | 9/2010 |
| JP | 2010212859 A | | 9/2010 |

* cited by examiner

FIG. 6A

ESTIMATE FORM                           DATE: YY/MM/DD

TO: XXXX INC.
                                    ADDRESS:
                                    TEL: OO(OOOO)-OOOO
TO: XXXX INC.                       FAX: OO(OOOO)-OOOO

THANK YOU FOR YOUR CONTINUED SUPPORT.
OUR PRICE ESTIMATE IS AS BELOW.

| DEPARTMENT MANAGER | SECTION MANAGER |
|---|---|
|  |  |

| NAME | QTY | UNIT PRICE | PRICE | NOTES |
|---|---|---|---|---|
|  |  |  | 0 |  |
|  |  |  | 0 |  |
|  |  |  | 0 |  |
|  |  |  | 0 |  |
|  |  |  | 0 |  |
|  |  |  | 0 |  |
|  |  | SUB TOTAL | 0 |  |
|  |  | TAX | 0 |  |
|  |  | TOTAL DUE | 0 |  |

TOTAL DUE  ¥_____ (TAX INCLUDED)

DUE DATE:     YY/MM/DD
PAYMENT TERMS:
EXPIRATION DATE:

※ IF YOU HAVE ANY QUESTION ABOUT THIS PRICE ESTIMATE,
     PLEASE CONTACT PERSON IN CHARGE

TEMPLATE IMAGE

FIG. 6B

FOR INTERNAL USE ONLY

DICTIONARY IMAGE

FIG. 6C

ESTIMATE FORM

DATE: YY/MM/DD

TO: XXXX INC.
ADDRESS:
TEL: OO(OOOO)-OOOO
FAX: OO(OOOO)-OOOO

TO: XXXX INC.

THANK YOU FOR YOUR CONTINUED SUPPORT.
OUR PRICE ESTIMATE IS AS BELOW.

| DEPARTMENT MANAGER | SECTION MANAGER |
|---|---|
|  |  |

| NAME | QTY | UNIT PRICE | PRICE | NOTES |
|---|---|---|---|---|
|  |  |  | 0 |  |
|  |  |  | 0 |  |
|  |  |  | 0 |  |
|  |  |  | 0 |  |
|  |  |  | 0 |  |
|  |  |  | 0 |  |
|  |  | SUB TOTAL | 0 |  |
|  |  | TAX | 0 |  |
|  |  | TOTAL DUE | 0 |  |

TOTAL DUE ¥_____ (TAX INCLUDED)
DUE DATE:       YY/MM/DD
PAYMENT TERMS:
EXPIRATION DATE:

FOR INTERNAL USE ONLY

※ IF YOU HAVE ANY QUESTION ABOUT THIS PRICE ESTIMATE,
PLEASE CONTACT PERSON IN CHARGE

EVALUATION IMAGE

FIG. 7

| ID (701) | FEATURE AMOUNT (702) | PREVIEW IMAGE (703) | JOB CONTROL INFORMATION (704) | VALID/INVALID (705) |
|---|---|---|---|---|
| 01 | desc01 | img01.jpg | JOB PROHIBITION | VALID |
| 02 | desc02 | img02.jpg | JOB PROHIBITION | INVALID |
| 03 | desc03 | img03.jpg | JOB PROHIBITION | VALID |

FIG. 10

| ID | FEATURE AMOUNT | PREVIEW IMAGE | JOB CONTROL INFORMATION | VALID/INVALID |
|---|---|---|---|---|
| 01 | desc01 | img01.jpg | JOB PROHIBITION JOB TRACKING | VALID |
| 02 | desc02 | img02.jpg | JOB TRACKING | INVALID |
| 03 | desc03 | img03.jpg | JOB PROHIBITION | VALID |

IMAGE FORMING APPARATUS WHICH REGISTERS IMAGE TO BE USED FOR CONTROLLING JOB AND METHOD FOR CONTROLLING IMAGE FORMING APPARATUS

BACKGROUND

Field of the Disclosure

The present disclosure relates to a technique for controlling a job that uses an input image, based on a result of comparison between the input image and a registered image.

Description of the Related Art

An image forming apparatus that analyzes a document image read by a scanner to control a process content of the document image, has been proposed.

Japanese Patent Application Laid-Open No. 2010-212859 discusses an apparatus that determines similarity between the document image read by the scanner and a dictionary image previously registered, to prohibit copying of the document image. Hereinafter, the registered image used for determination of similarity with the document image is referred to as "dictionary image".

According to Japanese Patent Application Laid-Open No. 2010-212859, it is possible for a user to newly register, as the dictionary image, the document image read by the scanner. However, an image that is not suitable as the dictionary image is registrable as well. The image unsuitable as the dictionary image is, for example, an image excessively small in size or an image including excessively thin texts. Such an image may result in low determination accuracy when similarity with the document image is determined. As a consequence, a document, copying of which should be prohibited, may get copied in some cases. Further, if the image unsuitable as the dictionary image is registered, the number of registered images is uselessly increased, which may cause determination of the document image to take excessively long time.

SUMMARY

The present disclosure is directed to a mechanism that makes it possible to prevent an image that is unsuitable as a dictionary image used to control a job that uses an input image, from being registered, and to register a suitable image.

According to an aspect of the present disclosure, provided is an image forming apparatus that is configured to determine whether an image having coincidence with a registered image is included in an input image and to control execution of a job using the input image based on a result of the determination. The image forming apparatus includes an input unit configured to input a first image as a candidate of the registered image, an evaluation unit configured to evaluate whether the first image is suitable for use in the determination, and a control unit configured to register the first image as the registered image when the evaluation unit evaluates that the first image is suitable for use in the determination, and to prevent the first image from being registered as the registered image when the evaluation unit evaluates that the first image is unsuitable for use in the determination.

Further features of the present disclosure will become apparent from the following description of exemplary embodiments with reference to the attached drawings.

BRIEF DESCRIPTION OF THE DRAWINGS

FIGS. 6A, 6B, and 6C are diagrams respectively illustrating a template image, the dictionary image, and an evaluation image according to one or more aspects of the present disclosure.

FIG. 7 is a table illustrating a data format of dictionary image information according to one or more aspects of the present disclosure.

FIG. 10 is a table illustrating a data format of dictionary image information according to one or more aspects of the present disclosure.

DESCRIPTION OF THE EMBODIMENTS

Figure 1:
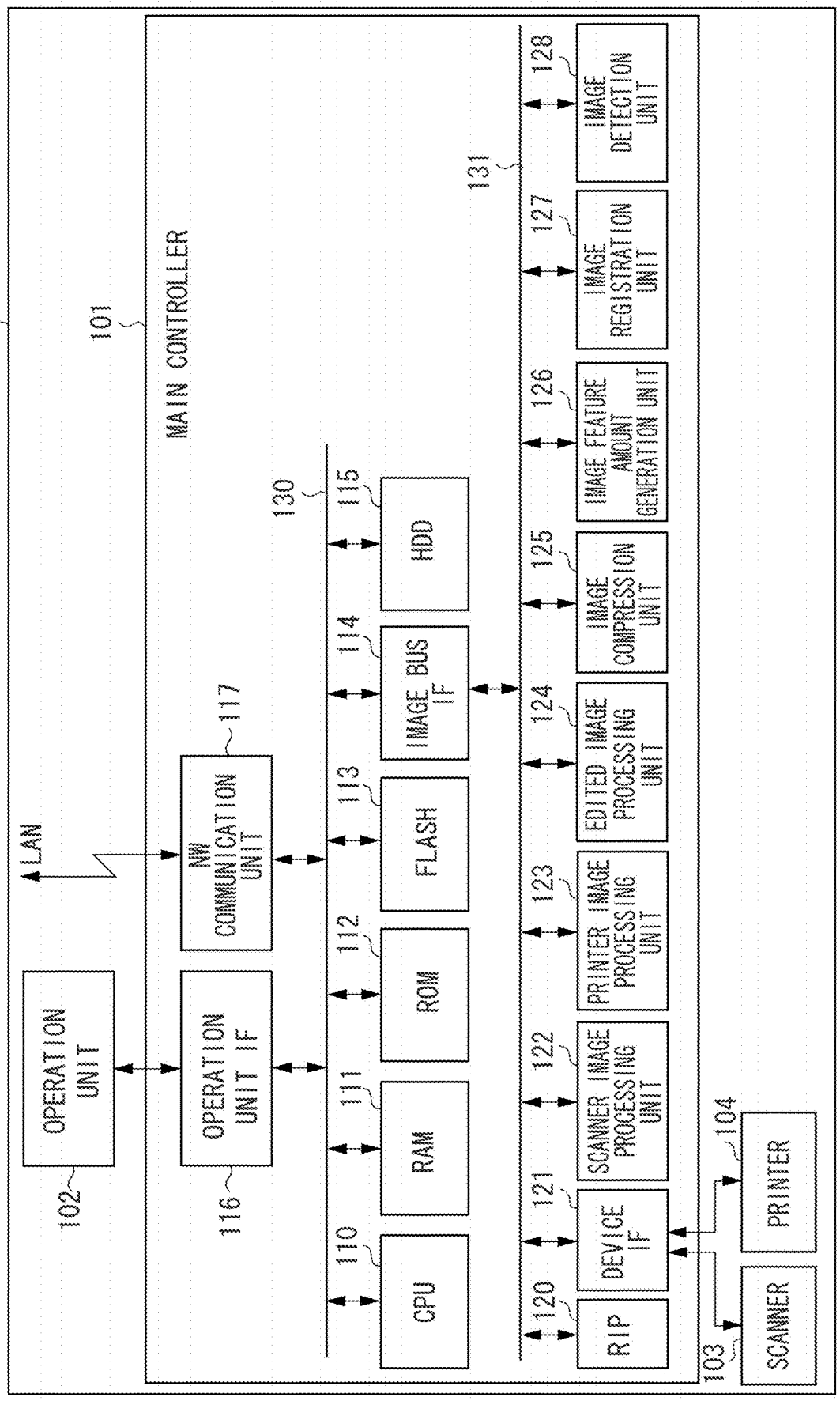
FIG. 1 is a block diagram illustrating an overall configuration of an image forming apparatus according to one or more aspects of the present disclosure.

Various exemplary embodiments, features, and aspects of the disclosure will be described in detail below with reference to the drawings. Components having similar functions in the drawings are denoted by the same reference numerals, and overlapped description is appropriately omitted.

A first exemplary embodiment will be described. FIG. 1 is a block diagram illustrating an overall configuration of an image forming apparatus according to an exemplary embodiment of the present disclosure.

An image forming apparatus 100 is a multifunctional apparatus that performs input/output and transmission/reception of an image, and performs various kinds of related image processing.

The image forming apparatus 100 includes a main controller 101, an operation unit 102 serving as a user interface, a scanner 103 serving as an image input device, and a printer 104 serving as an image output device.

The operation unit 102, the scanner 103, and the printer 104 are each connected to the main controller 101, and the main controller 101 controls operation of each unit.

The main controller 101 includes a central processing unit (CPU) 110 that performs main control. The CPU 110 is connected to a random access memory (RAM) 111, a read only memory (ROM) 112, and a flash 113 through a system bus 130. Further, the CPU 110 is connected to an image bus interface (IF) 114, a hard disk drive (HDD) 115, an operation unit IF 116, and a network (NW) communication unit 117.

The RAM 111 is a readable/writable memory for providing a work area as a main storage unit of the CPU 110. The RAM 111 is also used as an image memory that temporarily holds image data to be internally processed. The ROM 112 serves as a boot ROM that holds a boot program necessary for system activation and various kinds of process programs necessary for operation. The flash 113 is a nonvolatile memory, and holds system software, setting value information, and the like that need to be held after power-off of the image forming apparatus 100.

The image bus IF 114 is an interface that connects the system bus 130 to an image bus 131 through which image data is transferred, and operates as a bus bridge that converts bus protocols of the respective buses.

The HDD 115 is a nonvolatile data storage device, and holds various kinds of data such as image data, system data, and user data, and an operation program executed by the CPU 110. In a case where the main controller 101 is not connected to the HDD 115, the above-described various kinds of data is held by the flash 113.

The operation unit IF 116 is an interface that receives input from and provides output to the operation unit 102 that includes, for example, a liquid crystal touch panel. The operation unit IF 116 outputs, to the operation unit 102, image data to be displayed, and transmits, to the CPU 110, information input by a user through the operation unit 102. The NW communication unit 117 is a network interface for connection with local area network (LAN), and performs input/output of information to/from the LAN.

A raster image processor (RIP) 120, a device IF 121, a scanner image processing unit 122, a printer image processing unit 123, an edited image processing unit 124, and an image compression unit 125 are connected to the image bus 131. Further, an image feature amount generation unit 126, an image registration unit 127, and an image detection unit 128 are connected to the image bus 131.

The RIP 120 rasterizes page description language (PDL) data received from the LAN, to a bitmap image. The device IF 121 is an interface that connects various devices such as the scanner 103 and the printer 104 to the main controller 101, and performs transmission/reception of image data between the main controller 101 and the various devices.

The scanner image processing unit 122 performs image processing such as correction and modification on input image data read through the scanner 103. The printer image processing unit 123 performs processing such as color conversion and filter processing on printed output image data that is output to the printer 104. In addition, the edited image processing unit 124 performs, in a loop-back manner, image processing such as resolution conversion and layout conversion on image data held by the RAM 111 and the HDD 115. These image processing units are mounted as hardware processing using, for example, application specific integrated circuit (ASIC).

The image compression unit 125 performs Joint Photographic Experts Group (JPEG) compression/decompression processing on multilevel image data. In addition, the image compression unit 125 performs compression/decompression processing using encoding scheme such as Joint Bi-level Image Experts Group (JBIG) and modified modified read (MMR), on bi-level image data.

The image feature amount generation unit 126 performs local feature amount generation processing of a dictionary image and an input image. In generation of a feature point and a local feature amount, feature amount detection algorithms such as scale-invariant feature transform (SIFT), speeded-up robust features (SURF), and binary robust independent elementary features (BRIEF) are used.

The image registration unit 127 evaluates whether a dictionary image is detectable in an input image, and registers an image that has been determined to be detectable. The image registration unit 127 uses the feature amount of the dictionary image generated by the image feature amount generation unit 126. Further, the image registration unit 127 also performs determination and modification of added information of the dictionary image, and performs determination of whether the number of valid dictionary images is larger than a predetermined value. The detail of the processing will be described below. The dictionary image is stored together with the added information in the HDD 115 as dictionary image information.

The image detection unit 128 performs processing of detecting the dictionary image from the input image. The image detection unit 128 uses the feature amount of each of the dictionary image and the input image that are generated by the image feature amount generation unit 126, to perform matching processing, thereby detecting the dictionary image. In the matching processing using the feature amount of each of the input image and the dictionary image, it is possible to compare the feature amount of the input image and the feature amount of the dictionary image previously registered, to search a feature point of the dictionary image corresponding to a feature point of the input image. Voting (score calculation) within the input image plane is performed on each corresponding point of the input image obtained through the searching, with use of a vector with respect to a reference point (for example, a centroid) of the dictionary image. After voting to all of the corresponding points, a maximum voting value within the input image plane is determined, and presence/absence and a position of an image that has coincidence with (is coincident with or similar to a certain extent or more to) the dictionary image in the input image are determined based on whether the maximum value is equal to or larger than a predetermined value. The method of comparing the dictionary image and the input image is not limited to the above-described method, and any other method may be used as long as it is possible for the method to determine whether an image having coincidence with the dictionary image is included in the input image.

Each of the image feature amount generation unit 126, the image registration unit 127, and the image detection unit 128 described above includes, for example, a complex programmable logic device (CPLD), and operates based on circuit information or the like internally stored. The CPLD is an example without limitation.

The image forming apparatus 100 is an image processing apparatus that determines whether an image having coincidence with the dictionary image is included in the input image, and controls execution of a job (for example, a copy job) using the input image based on a result of the determination. In the image forming apparatus 100, a plurality of dictionary images is registrable. The processing to register the dictionary image is described below.

Figure 2:
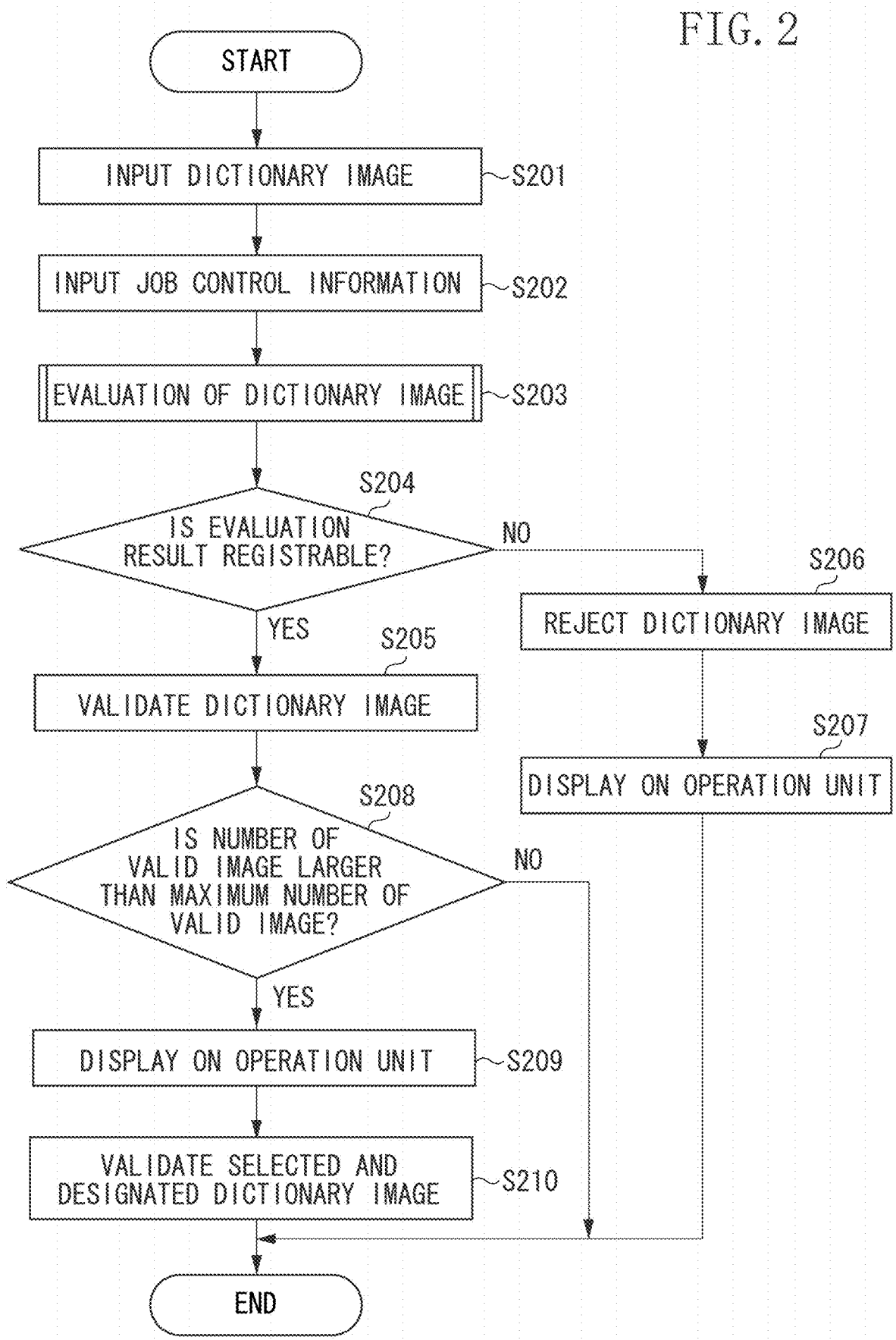
FIG. 2 is a flowchart illustrating image registration processing.
Figure 3:
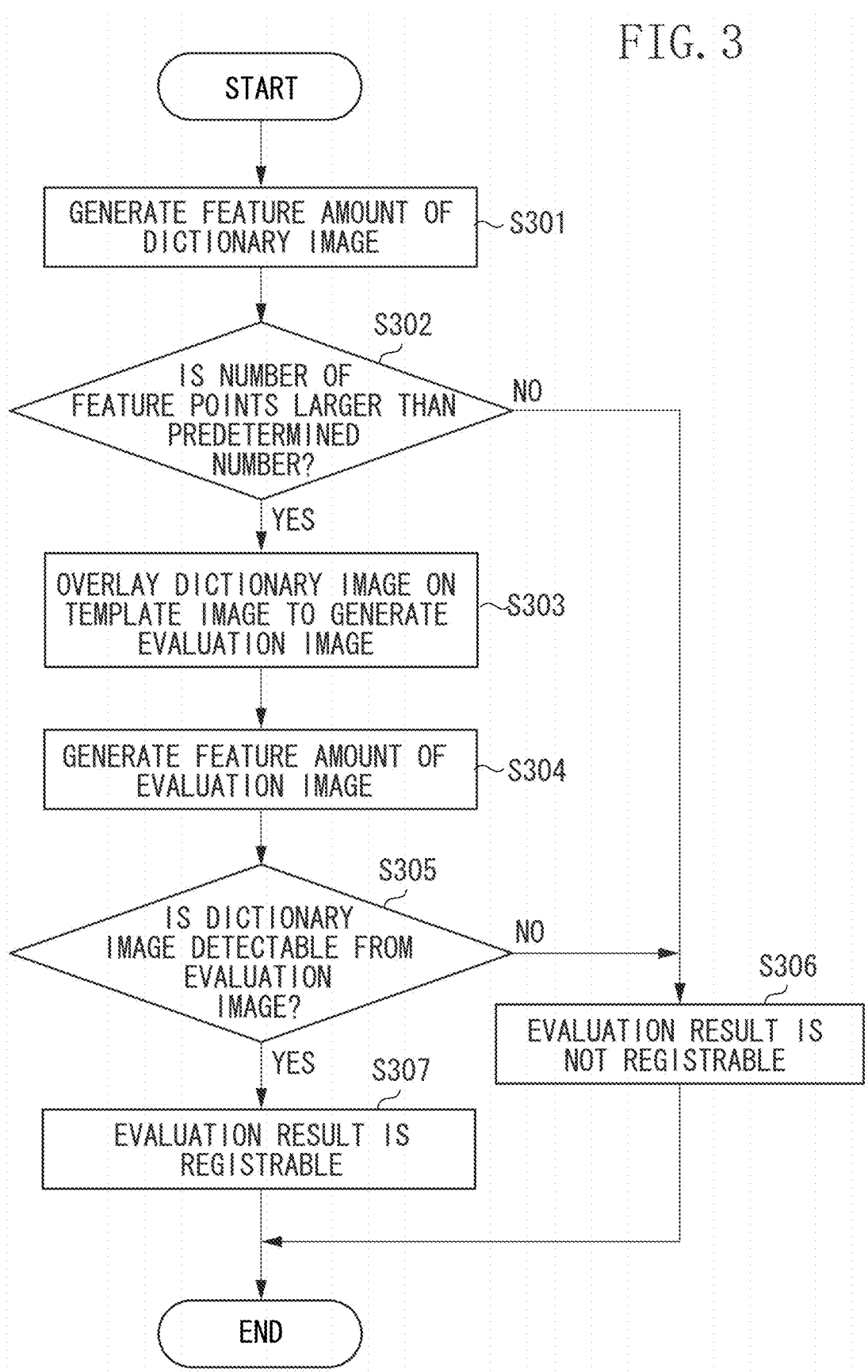
FIG. 3 is a flowchart illustrating an example of evaluation processing of a dictionary image according to one or more aspects of the present disclosure.
Figure 8:
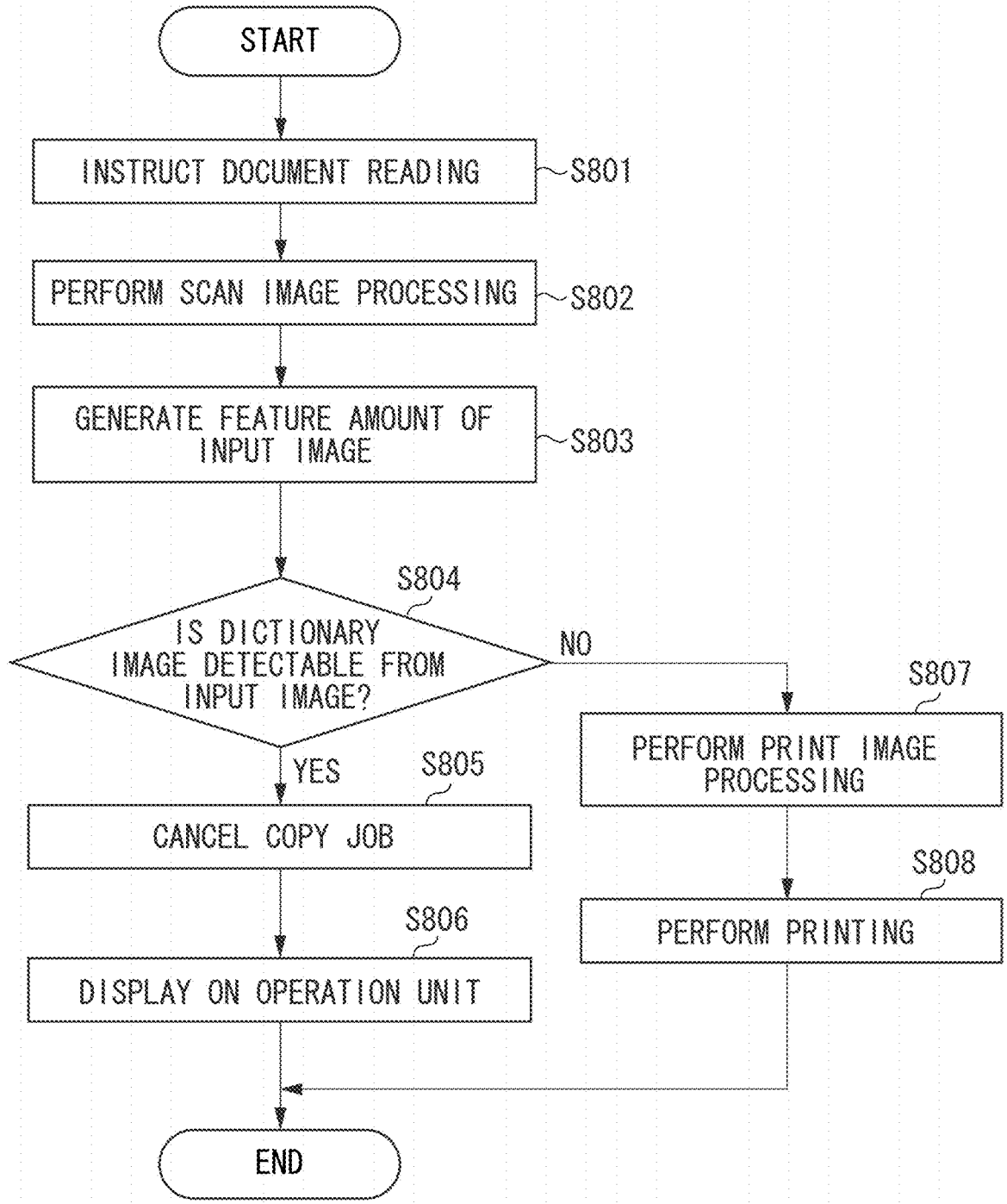
FIG. 8 is a flowchart illustrating an example of processing at the time of executing a copy job according to one or more aspects of the present disclosure.

FIG. 2 is a flowchart illustrating processing (image registration processing) to register an image in the image forming apparatus 100. The processing illustrated in flowcharts of FIG. 2, and FIG. 3 and FIG. 8, are achieved when the CPU 110 of the main controller 101 executes the program stored in the RAM 111.

For example, when execution of the processing to register an image in the image forming apparatus 100 is instructed from the operation unit 102, the CPU 110 starts the processing of the flowchart.

First, in step S201, the CPU 110 executes input processing of a dictionary image. For example, the dictionary image may be input through the scanner 103 of the image forming apparatus 100, or may be acquired through an unillustrated server connected with LAN through the NW communication unit 117. The image input in step S201 is a candidate image to be registered as the dictionary image. The input dictionary image is stored in the HDD 115. The resolution of the dictionary image is arbitrarily selected and is, for example, 200 dpi in the first exemplary embodiment. As described below, it is necessary for an evaluation image used in evaluation of the dictionary image to have the same resolution as the resolution of the dictionary image.

Next, in step S202, the CPU 110 receives input of job control information with respect to the dictionary image input in step S201, from the operation unit 102 or the like (step S202). The job control information is information indicating control or process performed on the job of the image forming apparatus 100 that is performed on the input image when the dictionary image is detected from the input image. The job control information is stored as a portion of the dictionary image information as illustrated in FIG. 7. The dictionary image information is stored in the HDD 115. Examples of the job control information include "job prohibition" for prohibiting the job that is being executed at the time when the dictionary image is detected from the input image, and "job tracking" for recording detection of the dictionary image in the information of the job that is being executed at the time when the dictionary image is detected from the input image. Here, the CPU 110 functions as a setting unit that sets, at a time of registration of the dictionary image, at least one of a plurality of controls or processes as a control or process to be performed on a job that uses an image having coincidence with the dictionary image. In the first exemplary embodiment, description is given by assuming that only "job prohibition" is settable. An example in which other job control information such as "job tracking" is settable in addition to "job prohibition" will be described in a second exemplary embodiment.

Next, in step S203, the CPU 110 executes evaluation processing of the dictionary image. The detail of the evaluation process of the dictionary image will be described in FIG. 3. A result of the evaluation processing of the dictionary image becomes "registrable" or "not registrable".

Next, in step S204, the CPU 110 determines whether the evaluation result in step S203 is "registrable". When it is determined that the evaluation result is "not registrable" (NO in step S204), the processing proceeds to step S206.

In step S206, the CPU 110 does not register the dictionary image input in step S201 and rejects the dictionary image. In this case, the CPU 110 also does not register the dictionary image information corresponding to the dictionary image. In step S207, the CPU 110 displays that the image has not been registered, on the operation unit 102, for example, as illustrated in FIG. 4, and the processing of the flowchart then ends.

Figure 4:
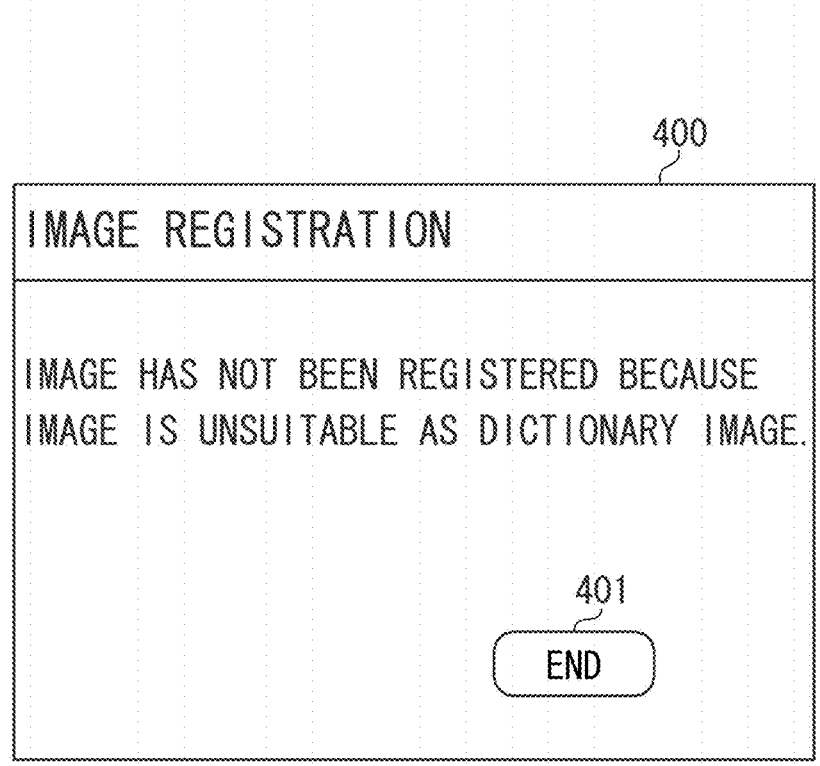
FIG. 4 is a diagram illustrating a screen when the dictionary image is not registrable according to one or more aspects of the present disclosure.

FIG. 4 is a diagram illustrating an example of a screen displayed on the operation unit 102 when the image has not been registered.

A message indicating that the image has not been registered, and an end button 401 that terminates an image unregistrable notification screen 400 are displayed in the image unregistrable notification screen 400.

The description is now back to the flowchart in FIG. 2.

If it is determined in step S204 that the evaluation result is "registrable" (YES in step S204), the processing proceeds to step S205. In step S205, the CPU 110 validates the dictionary image input in step S201. The validation of the dictionary image is performed by registering the dictionary image information corresponding to the dictionary image, and adding, to the dictionary image information, information indicating that the dictionary image is valid. As a result, the input image in step S201 is registered as the dictionary image.

Next, in step S208, the CPU 110 determines whether the number of valid images is larger than the maximum number of valid images. The number of valid images indicates the number of valid dictionary images among dictionary images. The maximum number of valid images is the number of dictionary images to be validated by the image forming apparatus 100, and is previously set and stored in the HDD 115.

When it is determined in step S208 that the number of valid images is not larger than the maximum number of valid images (NO in step S208), the processing of the flowchart ends.

In contrast, when it is determined in step S208 that the number of valid images is larger than the maximum number of valid images (YES in step S208), the processing proceeds to step S209. In step S209, the CPU 110 displays a screen to select and designate the image to be validated, on the operation unit 102, for example, as illustrated in FIG. 5.

Figure 5:
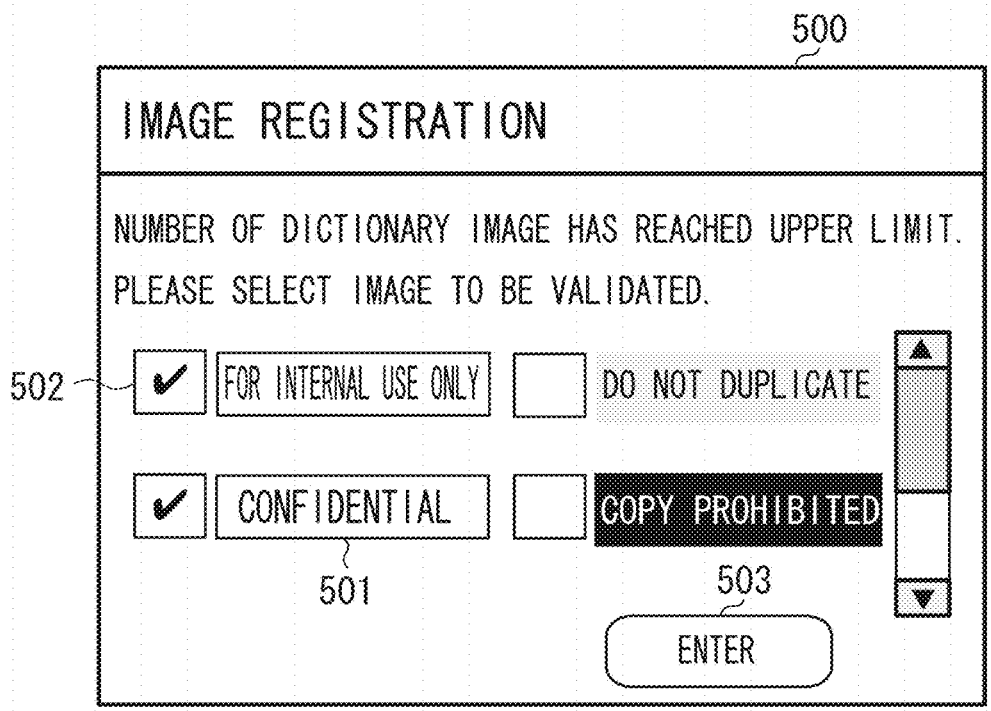
FIG. 5 is a diagram illustrating a selection designation screen of the dictionary image according to one or more aspects of the present disclosure.

FIG. 5 is a diagram illustrating an example of the screen displayed on the operation unit 102 when the user selects and designates the dictionary image to be validated.

A preview display 501 of the dictionary image, a selection region 502 for selecting valid/invalid of the dictionary image, and an ENTER button 503 for determining the dictionary image to be validated, are displayed in a valid image selection designation screen 500.

In FIG. 5, a mark is displayed (checked) in the selection region 502 in a case where the dictionary image to be validated is selected. The user operates the selection region 502 to select valid/invalid while confirming the preview display 501 of the dictionary image, and presses down the ENTER button 503, thereby determining the dictionary image to be validated. The selection region 502 is controlled such that valid image is selectable only up to the maximum number of valid images.

The description is now back to the flowchart of FIG. 2.

Next, in step S210, the CPU 110 performs processing of validating the dictionary image selected and designated by the user. The contents of the validation processing of the dictionary image is the same as the processing in step S205. As for the dictionary image that has not been selected and designated, information indicating that the dictionary image is invalid is added to the corresponding dictionary image information, thereby invalidating the dictionary image. The invalidation cancels registration of the image that has been registered as the dictionary image. The invalidated dictionary image information may be deleted in response to a user operation. After the process in step S210, the processing of the flowchart ends.

In the above description of FIG. 2, the configuration in which the information indicating that the dictionary image is valid is added to the dictionary image information at a time of validation and the information indicating that the dictionary image is invalid is added to the dictionary image information at a time of invalidation, has been described. The dictionary image information, however, may be registered at a time of validation and the dictionary image information itself may be deleted at a time of invalidation.

FIG. 3 is a flowchart illustrating an example of the evaluation processing for evaluating the dictionary image in the image forming apparatus 100 according to the first exemplary embodiment. The evaluation is performed by analyzing an image content of the dictionary image. In step S301, the CPU 110 provides, to the image feature amount generation unit 126, the dictionary image that has been input and stored in the HDD 115 in step S201 of FIG. 2, to generate the feature amount of the dictionary image. The generated feature amount is stored in the HDD 115.

Next, in step S302, the CPU 110 provides, to the image registration unit 127, the feature amount of the dictionary image generated in step S301, and determines whether the number of feature points is larger than a predetermined value. The predetermined value is the number of feature points sufficient for detection of the dictionary image in the image forming apparatus 100. The predetermined value may be previously held by the image registration unit 127 or by the HDD 115.

Then, when it is determined that the number of feature points is not larger than the predetermined value (NO in step S302), the CPU 110 evaluates the dictionary image as "not registrable" (step S306), and the processing of the flowchart ends.

In contrast, when it is determined that the number of feature points is larger than the predetermined value (YES in step S302), the processing proceeds to step S303. In step S303, the CPU 110 instructs the image registration unit 127 to overlay the dictionary image on the template image, thereby generating an evaluation image. Examples of the template image, the dictionary image, and the evaluation image are respectively illustrated in FIGS. 6A, 6B, and 6C.

FIGS. 6A, 6B, and 6C are diagrams respectively illustrating the template image, the dictionary image, and the evaluation image.

The template image of FIG. 6A is an arbitrary image that has been stored in the HDD 115. For example, a routine document format used in business is used as the template image.

The dictionary image of FIG. 6B is the dictionary image input in step S201 of FIG. 2, and which is stored in the HDD 115.

The evaluation image of FIG. 6C is generated by overlaying the dictionary image (FIG. 6B) on an arbitrary position of the template image (FIG. 6A). FIG. 6C illustrates an example in which the dictionary image is overlaid on the template image with coordinates [800, 1100] as a center. Alternatively, a plurality of evaluation images may be generated by using a plurality of template images, or overlaying the dictionary image on a plurality of coordinate positions of the template image. Further, the evaluation image has the same resolution as the resolution of the dictionary image (200 dpi in the first exemplary embodiment).

The description is now back to the flowchart of FIG. 3.

In step S304, the CPU 110 provides, to the image feature amount generation unit 126, the evaluation image generated in step S303 as an input image, to generate a feature amount of the evaluation image.

Next, in step S305, the CPU 110 provides, to the image detection unit 128, the feature amount of the dictionary image generated in step S301 and the feature amount of the evaluation image generated in step S304, to determine whether the dictionary image is detectable.

The determination of coincidence between the input image and the dictionary image is performed by the technique of matching the feature amount of the input image and the feature amount of the dictionary image. In the matching between the feature amounts, it is possible to compare the feature amount of the input image and the feature amount of the dictionary image with each other, and to search the feature point of the dictionary image corresponding to the feature point of the input image. Voting (score calculation) within the input image plane is performed on each corresponding point of the input image obtained through the searching, with use of a vector with respect to a reference point (for example, a centroid) of the dictionary image. After voting to all of the corresponding points, the maximum voting value (the maximum value) within the input image plane is determined, and presence/absence of a dictionary image and a position thereof in the input image are determined based on whether the maximum value is equal to or larger than the predetermined value. In this way, it is possible to determine coincidence between the input image and the dictionary image. When it is determined that the input image and the dictionary image have coincidence, the dictionary image is determined to be "detectable". In contrast, when it is determined that the input image and the dictionary image do not have coincidence, the dictionary image is determined to be "undetectable".

When it is determined in step S305 that the dictionary image is undetectable (NO in step S305), the CPU 110 evaluates the dictionary image as "not registrable" (step S306), and the processing of the flowchart ends.

In contrast, when it is determined in step 305 that the dictionary image is detectable (YES in step S305), the CPU 110 evaluates the dictionary image as "registrable" (step S307), and the processing of the flowchart ends. The evaluation results of the dictionary image in steps S306 and S307 are used in step S204 of FIG. 2.

FIG. 7 is a diagram illustrating a data format of the dictionary image information generated as a result of the image registration processing (the processing illustrated in FIG. 2 and FIG. 3) in the first exemplary embodiment.

As illustrated in FIG. 7, the data format of the dictionary image information in the first exemplary embodiment includes an ID 701, a feature amount 702 of the dictionary image generated in step S301, a preview image 703 used in preview of the dictionary image, job control information 704 input in step S202, and valid information 705 of the dictionary image input in step S205. The dictionary image information is created, for example, when the dictionary image is input in step S201. At this time, the ID 701 and the preview image 703 are also created, and are added to the dictionary image information. For example, the preview image 703 is generated by performing resolution conversion by the edited image processing unit 124 on the image data (for example, image data subjected to the scanner image processing) input as the dictionary image in step S201. Further, the ID 701 is usable to, for example, associate the dictionary image information and the dictionary image with each other.

FIG. 8 is a flowchart illustrating processing in a case where a copy job is performed while the detection processing of the dictionary image is activated in the image forming apparatus 100 in the first exemplary embodiment.

When the CPU 110 detects that execution of the copy job has been instructed by the user through the operation unit 102, the processing of the flowchart starts. The copy job is performed while the detection processing of the dictionary image is activated in the image forming apparatus 100. In step S801, the CPU 110 instructs, through the device IF 121, the scanner 103 to read a document. The scanner 103 performs a process in step S802 in response to the instruction.

In step S802, the scanner 103 performs reading of the document, and transmits data of the read image to the scanner image processing unit 122 through the device IF 121. The CPU 110 controls the scanner image processing unit 122 to perform various kinds of scan image processing on the received image data, and transmits the image data after the image processing to the RAM 111 or the HDD 115.

Next, in step S803, the CPU 110 acquires the image data after the scanner image processing from the RAM 111 or the HDD 115, and provides the image data as the input image to the image feature amount generation unit 126 to generate a feature amount. In step S803, if the image data after the scanner image processing is different in resolution from the dictionary image, the CPU 110 uses the edited image processing unit 124 to perform resolution conversion on the image data after the scanner image processing such that the resolution of the image data after the scanner image processing becomes the same as the resolution of the dictionary image.

Next, in step S804, the CPU 110 provides, to the image detection unit 128, the feature amount of the input image and the feature amount of the dictionary image, and determines whether the dictionary image is detectable from the input image. The detection method is similar to the detection method in step S305 of FIG. 3, and matching between the feature amounts is used. In a case where a plurality of dictionary images is present, matching between the input image and each of all the dictionary images is performed.

Thereafter, when the dictionary image is detected, namely, when the dictionary image is determined to be detectable (YES in step S804), the processing proceeds to step S805. In step S805, the CPU 110 cancels the copy job, execution of which has been instructed as described above. Further, in step S806, the CPU 110 displays, on the operation unit 102, that the copy job instructed as described above has been canceled, and the processing of the flowchart ends.

In contrast, when the dictionary image has not been detected, namely, when the dictionary image is determined to be undetectable (NO in step S804), the processing proceeds to step S807. In step S807, the CPU 110 transmits the above-described image data after the scanner image processing, to the printer image processing unit 123 from the RAM 111 or the HDD 115. Further, the CPU 110 controls the printer image processing unit 123 to perform various kinds of print image processing on the received image data (the above-described image data after the scanner image processing), and transmits the processed image data to the printer 104. Finally, the CPU 110 instructs the printer 104 to print the image data on paper (print execution) (step S808). The processing of the flowchart then ends.

As described above, in the first exemplary embodiment, evaluation regarding suitability of an image as the dictionary image is performed at a time of registration of the image, which makes it possible to register only the detectable image as the dictionary image. At a time of the evaluation, the evaluation image is generated to allow confirmation that the dictionary image is detectable from the evaluation image. This makes it possible to register only the image detectable robustly to fine variation in the image that is caused by, for example, image reading by the scanner. The present exemplary embodiment is merely an example, and the present disclosure is not limited to the present exemplary embodiment.

Moreover, in the evaluation of the dictionary image at a time of the registration, the registrable lowest resolution and the registrable minimum image size may be previously defined, and the dictionary image may be determined to be detectable when the dictionary image has resolution and size that respectively exceed the registrable lowest resolution and the registrable minimum image size.

In the above-described first exemplary embodiment, the configuration in which the dictionary image (the candidate) is overlaid on the template image to generate the evaluation image, and the evaluation whether the dictionary image (the candidate) is registrable is performed based on whether the dictionary image is detectable from the evaluation image, has been described. It is, however, sufficient for the evaluation image to include at least the dictionary image. For example, the dictionary image (the candidate) itself may be used as the evaluation image.

In the first exemplary embodiment, the case where only "job prohibition" is settable as the job control when the dictionary image is detected (the process performed for the job when the dictionary image is detected), has been described. In a second exemplary embodiment, a case where a plurality of kinds of job control is settable when the dictionary image is detected, will be described. Differences with the first exemplary embodiment will mainly be described.

A block diagram of the image forming apparatus 100 in the second exemplary embodiment is the same as the block diagram of FIG. 1, and is accordingly omitted. Further, the flowchart for the image registration is the same as the flowchart of FIG. 2; however, one or more of a plurality of kinds of job control information are inputtable in the step of inputting the job control information (step S202 in FIG. 3). For example, "job prohibition" and "job tracking" may be input.

Figure 9:
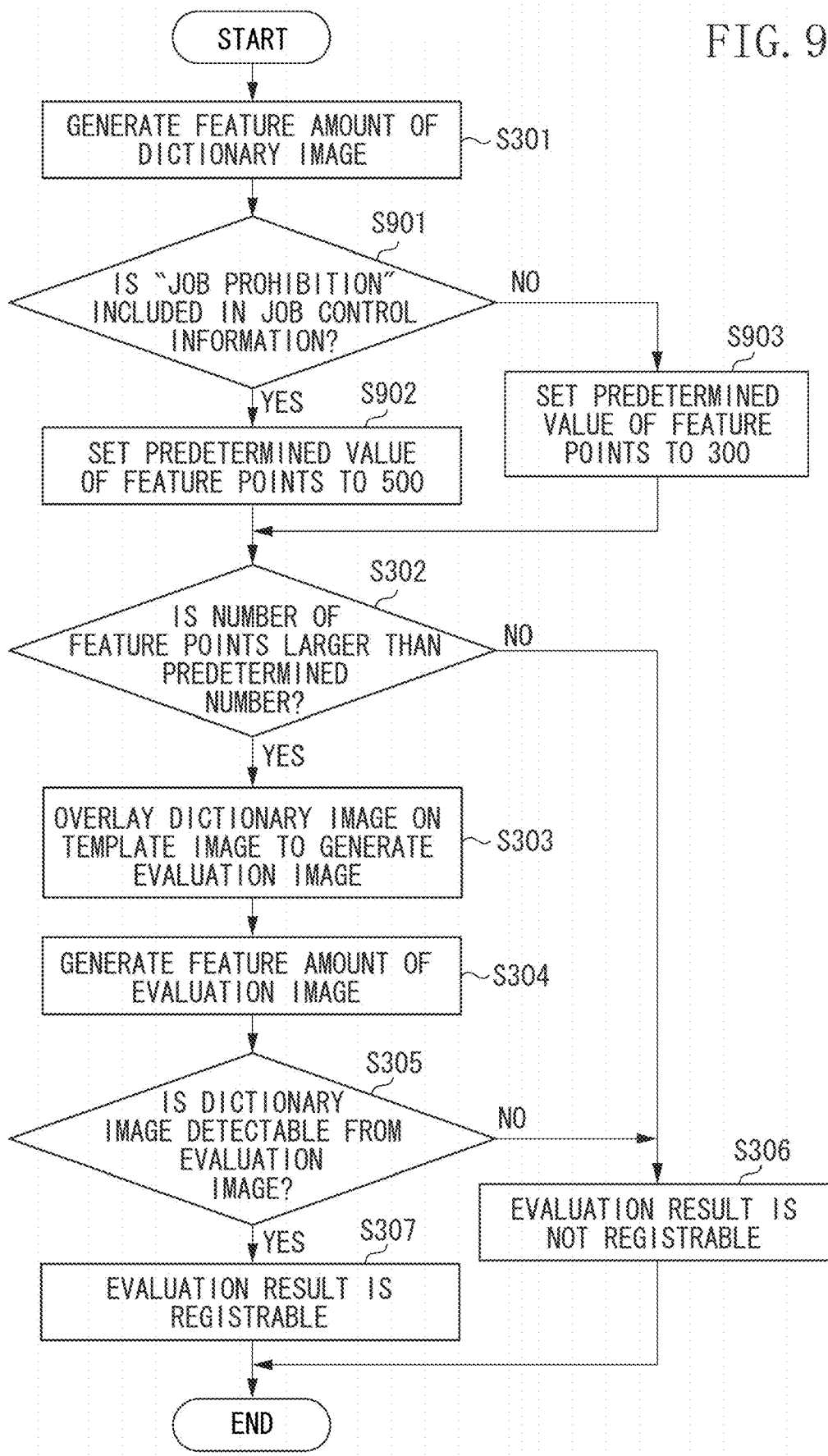
FIG. 9 is a flowchart illustrating an example of evaluation processing of a dictionary image according to one or more aspects of the present disclosure.
Figure 11:
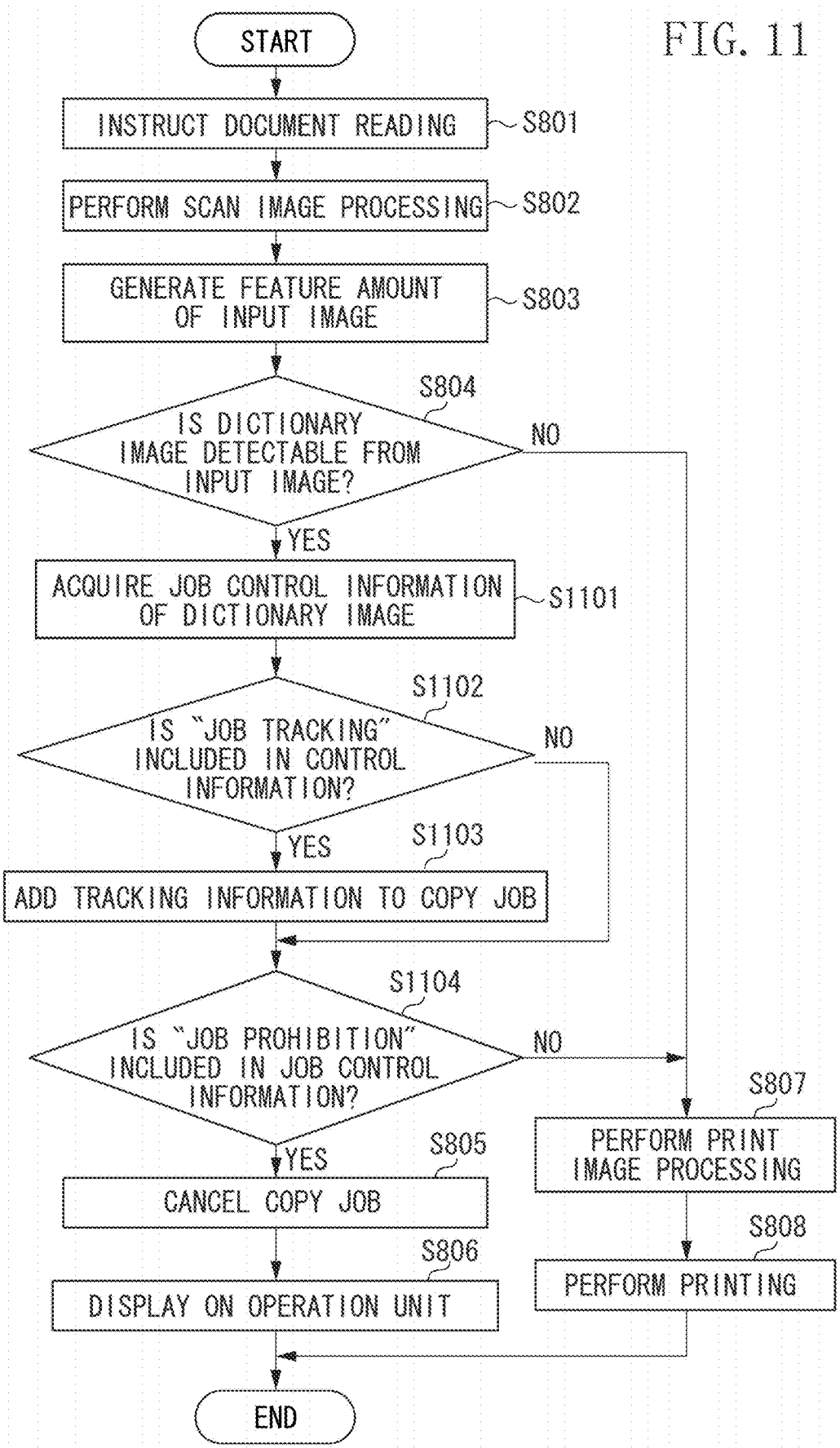
FIG. 11 is a flowchart illustrating an example of processing at the time of executing a copy job according to one or more aspects of the present disclosure.

FIG. 9 is a flowchart illustrating evaluation processing of evaluating the dictionary image in the image forming apparatus 100 in the second exemplary embodiment, and the steps same as the steps in FIG. 3 are denoted by the same step numbers. The processing illustrated in flowcharts of FIG. 9 and FIG. 11 is achieved when the CPU 110 of the main controller 101 executes a program stored in the RAM 111.

FIG. 9 will be described below, focusing on differences from FIG. 3.

After the feature amount generation of the dictionary image (step S301), the CPU 110 determines whether "job prohibition" is included in the job control information of the dictionary image (step S901).

When it is determined that "job prohibition" is included in the job control information of the dictionary image (YES in step S901), the processing proceeds to step S902. In step S902, the CPU 110 sets a predetermined value of the feature points that is to be compared with the number of feature points of the dictionary image in subsequent step S302, to "500".

In contrast, when it is determined that "job prohibition" is not included the job control information of the dictionary image (NO in step S901), the processing proceeds to step S903. In step S903, the CPU 110 sets the predetermined value of feature points that is to be compared with the number of feature points of the dictionary image in subsequent step S302, to "300".

The processing of the present flowchart controls the predetermined value set in step S902 so as to be larger than the predetermined value set in step S903, and the predetermined values "500" and "300" are merely examples without limitation.

In step S302, the CPU 110 compares the predetermined value set in step S902 or S903 with the number of feature points of the dictionary image. Increasing the predetermined value when "job prohibition" is included in the job control information makes it possible to surely detect only the dictionary image. In contrast, when "job prohibition" is not included but "job tracking" is included in the job control information, setting the predetermined value smaller than the predetermined value in the case where "job prohibition" is included allows for tracking even in a case where the image similar to the dictionary image is detected. The subsequent processes are the same as the processes in FIG. 3, and description of the processes are accordingly omitted.

FIG. 10 is a diagram illustrating a data format of the dictionary image information generated as a result of the image registration processing (the processing illustrated in FIG. 2 and FIG. 9) in the second exemplary embodiment, and the parameters same as the parameters in FIG. 7 are denoted by the same reference numerals.

The job control information 1001 corresponds to the job control information in the second exemplary embodiment input in step S202 (FIG. 9). As illustrated in FIG. 10, in the data format of the dictionary image information in the second exemplary embodiment, a plurality of kinds of job control information such as "job prohibition" and "job tracking" is included in the job control information 1001. In the job control information 1001 in the second exemplary embodiment, it is possible to hold the plurality of kinds of job control information such as "job prohibition" and "job tracking".

FIG. 11 is a flowchart illustrating processing in a case where the copy job is performed while the detection processing of the dictionary image is activated in the image forming apparatus 100 in the second exemplary embodiment. The steps same as the steps in FIG. 8 are denoted by the same step numbers. Differences from FIG. 8 will mainly be described below.

When the dictionary image has been detected, namely, when the dictionary image is determined to be detectable in step S804 (YES in step S804), the processing proceeds to step S1101. In step S1101, the CPU 110 acquires the above-described job control information of the dictionary image. In the present exemplary embodiment, the CPU 110 may acquire three kinds of job control information of "job prohibition" only, "job tracking" only, and both of "job prohibition" and "job tracking".

Next, in step S1102, the CPU 110 determines whether "job tracking" is included the control information acquired in step S1101. When it is determined that "job tracking" is included (YES in step S1102), the processing proceeds to step S1103. In step S1103, the CPU 110 adds tracking information to the copy job, and the processing proceeds to step S1104. Addition of the tracking information indicates, for example, addition of a flag to the job information. As a result, the job added with the tracking information is detectable from job history later.

In contrast, when it is determined that "job tracking" is not included (NO in step S1102), the processing proceeds to step S1104.

In step S1104, the CPU 110 determines whether "job prohibition" is included in the above-described control information. When it is determined that "job prohibition" is included (YES in step S1104), the processing proceeds to step S805. Subsequent processes are similar to the processes in FIG. 8, and description of the processes are accordingly omitted.

In contrast, when it is determined that "job prohibition" is not included (NO in step S1104), the processing proceeds to step S807. Subsequent processes are similar to the processes in FIG. 8, and description of the processes are accordingly omitted.

As described above, in the second exemplary embodiment, a plurality of kinds of job control information is addable to the dictionary image. By determining, at a time of the detection, the job control information added to the dictionary image, appropriate job control becomes possible. The present exemplary embodiment is merely an example and the present disclosure is not limited to the present exemplary embodiment.

In addition, as the method of determining the maximum number of valid images, it is possible to hold relationship between the number of valid images and a process time necessary for detection of the dictionary image. Then, the number of valid images that takes a process time exceeding the predetermined process time (or the maximum number of valid images searchable within a predetermined process time) may be used as the maximum number of valid images. Further, the predetermined process time may be designated by the user. Furthermore, a valid-image number priority mode and a process-time priority mode may be provided, and the user may select the mode to determine the predetermined process time.

In the above-described exemplary embodiment, the configuration in which any of the dictionary images are invalidated in response to the user operation when the number of valid images has reached the maximum number of valid images in an attempt to register and validate the novel dictionary image, has been described. Alternatively, the novel dictionary image may not be registered and validated when the number of valid images has reached the maximum number of valid images in the attempt to register and validate the novel dictionary image.

In addition, the feature amount of a dictionary image may be compared with the feature amount of the registered dictionary image at a time of registration of the image. When the difference is equal to or smaller than a predetermined value, the registered dictionary image may be used instead of newly registering the image.

Further, as the job control information, "job permission with conditions" may be provided. "Job permission with conditions" indicates job control that permits a job when conditions such as an attribute of a user and input of a password are satisfied. For example, a usage in which a job is permitted depending on an organization, a post, or the like of the user may be considered.

As described above, the image forming apparatus 100 according to the second exemplary embodiment is configured to determine whether the image coincident with (similar to) the image registered by the user is included in the document, with use of the feature amount of the registered image and the feature amount of the document image, and to prohibit the copy job and the like according to the determination result. Further, the image forming apparatus 100 is configured to prevent an image unsuitable for use in the determination from being registered as the registered image. In other words, the image forming apparatus 100 evaluates whether the image is suitable as the dictionary image and controls whether to register the image as the dictionary image according to the evaluation result. Such a configuration makes it possible to prevent registration of the image unsuitable for use in the determination. Accordingly, it is possible for the user to register a suitable image as the dictionary image that is used to control processing of the input image. In other words, it is possible to prevent the user from registering an unsuitable image as the dictionary image that is used to control processing of the input image.

The image unsuitable for use in the determination is, for example, an image intended to be registered by the user, which is not detectable from the evaluation image generated by overlaying the image intended to be registered on the template because the number of feature amounts is smaller than the predetermined number.

Further, the image forming apparatus 100 is configured to prevent the image from being registered when the number of registered images is equal to or larger than a threshold. This makes it possible to solve an issue that the determination of all registered images takes a long time due to a large number of images being registered.

Moreover, in each of the above-described exemplary embodiments, the case where the copy job is controlled based on coincidence (similarity) between the document and the registered dictionary image, has been described as an example; however, the job controlled based on the coincidence (similarity) with the dictionary image is not limited to the copy job. For example, a print job may be controlled based on coincidence (similarity) between an image included in the print job and the dictionary image. Further, a scan job may be controlled based on coincidence (similarity) between a document and the registered dictionary image.

As described above, the exemplary embodiments of the present disclosure make it possible to prevent registration of the image unsuitable as the dictionary image that is used to control a job that uses an input image, and to accordingly register the appropriate number of suitable images.

The configurations and the contents of the various kinds of data described above are not limited to those descried above, and the data may be configured with various configurations and contents depending on application or purpose.

Although some exemplary embodiments have been described, the present disclosure may be embodied as, for example, a system, an apparatus, a method, a program, or a storage medium. More specifically, the present disclosure may be applied to a system including a plurality of devices, or may be applied to an apparatus including one device.

Moreover, the present disclosure also encompasses combination of the above-described exemplary embodiments.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-209492, filed Oct. 26, 2016, which is hereby incorporated by reference herein in its entirety.

What is claimed is:

1. An image forming apparatus which inputs an image, and determines whether to execute a job that processes the image based on the image and a registered image, the image forming apparatus comprising:
    a storage; and
    a processor that registers, in the storage, a new image as the registered image;
    wherein the processor determines, based on an image size of the new image, whether to register the new image as the registered image,
    wherein the processor registers, in the storage, the new image as the registered image if the processor determines to register the new image as the registered image, and
    wherein the processor does not register, in the storage, the new image as the registered image if the processor determines not to register the new image as the registered image.

2. The image forming apparatus according to claim 1, wherein the image forming apparatus determines whether to execute the job that processes the image based on whether the registered image is included in the image.

3. The image forming apparatus according to claim 2, wherein the image forming apparatus determines to execute the job that processes the image if the registered image is not included in the image, and
    wherein the image forming apparatus determines not to execute the job that processes the image if the registered image is included in the image.

4. The image forming apparatus according to claim 1, wherein the image forming apparatus inputs, by reading a document, the image of the document.

5. The image forming apparatus according to claim 1, wherein the evaluation unit evaluates that the first image is unsuitable for use in the determination when the first image has a size smaller than a predetermined size.

6. The image forming apparatus according to claim 1, wherein the processor does not register, in the storage, the new image as the registered image if the number of the registered image exceeds a predetermined number.

7. A control method for controlling an image forming apparatus which inputs an image, and determines whether to execute a job that processes the image based on the image and a registered image, the control method comprising:
    registering a new image as the registered image; and determining, based on an image size of the new image, whether to register the new image as the registered image, wherein the new image is registered as the registered image if it is determined to register the new image as the registered image, and wherein the new image is not registered as the registered image if it is determined not to register the new image as the registered image.

8. An image forming apparatus which inputs an image, and determines whether to execute a job that processes the image based on the image and a registered image, the image forming apparatus comprising:

a storage; and a processor that registers, in the storage, a new image as the registered image, wherein the processor determines, based on a resolution of the new image, whether to register the new image as the registered image, wherein the processor registers, in the storage, the new image as the registered image if the processor determines to register the new image as the registered image, and wherein the processor does not register, in the storage, the new image as the registered image if the processor determines not to register the new image as the registered image.

* * * * *